Patented July 6, 1943

2,323,831

UNITED STATES PATENT OFFICE 2,323,831

PROCESS OF ADHESION

Adolf Menger and Eugen Bock, Krefeld-Uerdingen, Germany; vested in the Alien Property Custodian No Drawing. Application January 17, 1939, Serial No. 251,374. In Germany January 21, 1938

8 Claims. (Cl. 144—309)

This invention relates to a process for the adhesion of materials of all kinds which process possesses a series of important advantages compared with the hitherto known processes.

It is quite generally desirable in the practice of adhesion to work with small quantities by weight of adhesive per unit of area, not only on grounds of economy but also because thick layers of adhesive unfavourably influence the properties of the finished object. In the case of liquid adhesives or adhesive solutions, however, the uniform coating of very thin layers onto the surfaces to be united is in most cases extraordinarily difficult, particularly when porous materials such as wood, leather, fibrous material and the like are concerned. In the case of wood, for example, even with the application of very good coating devices and with very practised workmen, it is scarcely possible to work with less than 130 ccm. of liquid adhesive per sq. metre. In by far the majority of cases considerably more will be used unless the uniformity and rapidity of the work is to suffer. In order in spite of this to use as little as possible, extending agents are employed including either liquid materials, primarily water and other solvents, or solid materials. The liquid and volatile diluents, particularly when they are used in larger quantity than is sufficient for attaining the necessary covering power, entail numerous important disadvantages, as for example penetration of the adhesive, retarding of the binding operation and so on. Solid filling materials in themselves consume a part of the adhesive employed in the binding, and may also, especially when a hard filler is used, disadvantageously influence the properties of the bond or adhesive union.

In accordance with the present invention all these disadvantages are avoided. According to the invention an adhesive foam is employed, that is to say to a certain degree an adhesive which is extended with air or other gases in finely divided form. There is obtained in this manner with the application of the smallest possible quantities, strong and, most important, uniform adhesive unions. A foam produced from a solid adhesive or an adhesive solution can, by painting, spreading, rolling on by hand or by means of machines and also by spraying, be applied uniformly in a simple manner to the surfaces to be united, in which case it is particularly important that the foam layer on account of its small specific gravity can be applied relatively thickly. The foam remains on porous surfaces quite well and is not absorbed and does not penetrate.

The production of the foam takes place in any known manner by fine distribution of gases, in particular of air, in the liquid or dissolved adhesive, for example, by beating air into the liquid adhesive by means of a rapidly revolving stirring mechanism. The presence of such auxiliary agents as are known to be foam-forming or foam-promoting is of advantage. As such additions or auxiliary agents there come into consideration albumen compounds, such as casein, hide glue, bone glue, blood, blood albumen, saponins and furthermore alkali metal sulfonates of polyaklylated hydrocarbons, such as the salts of diisopropyl naphthalene sulfonic acid or dibutyl naphthalene sulfonic acid, salts of sulfonated tar oils or of sulfonated fatty acids, water soluble salts, for example ammonium salts of high molecular aliphatic carboxylic acids, such as fatty acids, wax acids, rosin acids and montanic acid. The gas can also be produced in known manner in the adhesive solution itself, say in such a manner that carbonates or bicarbonates are added thereto and a splitting off of carbon dioxide effected by heating or addition of acid.

The adhesive can be employed not only in the form of a liquid foam consisting of liquid films and gas bubbles but also in the form of a solidified foam, that is to say consisting of solid lamallae and gas. The solid foams may be produced by known processes involving physical or chemical drying of the liquid substances in foam form, for example, a concentrated solution of a urea-formaldehyde condensation product, which if desired, may contain a hardening agent. For adhesive purposes, the solid foams may be produced on or applied in the solid state to carriers, such as paper or textiles.

Among the adhesives suitable to be employed in the form of a foam according to this invention may be mentioned for example adhesives of natural origin, such as bone glue, hide glue, dextrine, synthetic adhesives, such as phenol formaldehyde condensation products, polyvinyl ethers, for example polyvinyl ethyl ether, polyvinyl butyl or isobutyl ether, polyvinyl esters, for example polyvinyl acetate and poylvinyl chloride, polyacryl esters, for example polyacryl methyl ester, polyacryl ethyl ester and polyacryl butyl ester. The process is of particular advantage in the employment of adhesives built upon a basis of urea formaldehyde condensation products, since these must in most cases be employed in as concentrated a form as possible and hence give rise to the difficulties initially set out to a very high degree. The foam of urea formaldehyde condensation products if desired is provided with a hardening agent known in the art, especially an acid hardening agent, such as ammonium chloride, ammonium sulfate, zinc chloride, zinc nitrate, hydrochloric acid, phosphoric acid and so on.

By the application of these adhesives in foam form, materials of all kinds may be cemented together, with particular advantage wood and other porous materials, such as leather, textiles and pasteboard. The adhesives are also applicable to the cementing of artificial materials, such as galalith, phenol aldehyde condensation products, porcelain, earthenware, metal, glass and the like. It is to be understood that each of these materials may be cemented with material of the same kind or with one of the other materials of different kind.

After coating, the foam has served its purpose and the process is continued under conditions by which the foam structure of the adhesive is destroyed. Such destruction of the foam structure occurs under the working conditions usual in the gluing technique, particularly those of the veneering art, i. e. with application of heat and pressure, so that the cementing layer formed thereby no longer possesses a foam structure. Tests have shown that the stability of the adhesion thus obtained remains the same as in the known gluing processes, although the amount of glue applied per square metre is only one-half to one-third of the amounts used in the known processes.

The invention is illustrated but not restricted by the following examples; the parts are by weight:

Example 1

To 75 parts of a 65% aqueous solution of urea formaldehyde condensation product are added a solution of 9 parts of casein, 3.5 parts of urea, 2 parts of a 25% aqueous ammonia solution, 45 parts of water, 0.6 part of ammonium chloride as a hardening agent and 0.8 part of butylated naphthalene sulfonic acid and furthermore 10 parts of wood meal. Into this mixture is incorporated air in finely divided form for which purpose a rapidly revolving stirring mechanism can be employed. The treatment in the stirrer takes place until the volume of the batch of glue has become three to five times as great as the original volume.

The glue mixture is coated on wood veneers by means of one of the customary roller machines. In this coating by means of rollers on an average 200–250 ccm. of the mixture are used per sq. metre of surface. For the production of a plywood sheet for example a veneer of camwood 2 mm. thick is coated on both sides with glue. Then veneers not treated with glue are positioned on both sides with the grain at right angles to that of the middle layer. Then the whole is pressed in a hot press at 90–100° C. at a pressure of about 10 atmospheres for 10 minutes. Thereby adhesion is effected with simultaneous destruction of the foamy structure of the glue.

Example 2

Instead of the glue mixture employed in Example 1 a mixture prepared in the following manner is employed:

To 60 parts of a 65% aqueous solution of a urea formaldehyde condensation product are added 1.2 parts of a butylated naphthalene sulfonic acid, 0.7 part of ammonium chloride as a hardening agent, 4.4 parts of urea, 2.5 parts of a 25% aqueous ammonia solution, 14.5 parts of a 20% solution of bone glue and 3.7 parts of ammonium bicarbonate. After good mixing of these constituents there are gradually stirred in 13 parts by weight of a 10% aqueous solution of acetic acid. During the stirring in of the acetic acid the volume of the glue mixture is increased to about double.

Example 3

Instead of the glue mixture employed in Examples 1 and 2 there is employed a mixture produced as follows:

To 50 parts of a 65% aqueous solution of a urea formaldehyde condensation product are added 1 part of butylated naphthalene sulfonic acid, 0.7 part of ammonium chloride, 3.5 parts of urea, 2 parts of ammonia, 16 parts of a 50% aqueous blood albumen solution and finally 26.8 parts of water. Into this mixture air is incorporated by a rapidly running stirring mechanism until a foam of about 3 times the volume of the original mixture is obtained.

We claim:

1. Process of adhesion which comprises coating pieces of material with an adhesive in the form of a foam and then cementing them together by heat and pressure.

2. Process of adhesion which comprises coating pieces of material with an adhesive in the form of a liquid foam and then cementing them together by heat and pressure.

3. Process of adhesion which comprises coating pieces of wood with an adhesive in the form of a liquid foam and then cementing them together by heat and pressure.

4. Process of adhesion which comprises coating pieces of material with an adhesive comprising a urea formaldehyde condensation product in the form of a liquid foam and then cementing them together by heat and pressure.

5. Process of adhesion which comprises coating pieces of wood with an adhesive in the form of a liquid foam comprising a urea formaldehyde condensation product provided with an acid hardener and then cementing them together by heat and pressure.

6. Process of adhesion which comprises coating pieces of wood with an adhesive in the form of a liquid foam comprising a urea formaldehyde condensation product, casein, ammonia, ammonium chloride and then cementing them together by pressing at 90–100° C., at a pressure of about 10 atmospheres.

7. Process of adhesion which comprises coating pieces of wood with an adhesive in the form of a liquid foam comprising a urea formaldehyde condensation product, bone glue, ammonia, ammonium chloride and butylated nphthalene sulfonic acid and then cementing them together by pressing at 90–100° C., at a pressure of about 10 atmospheres.

8. Process of adhesion which comprises coating pieces of wood with an adhesive in the form of a liquid foam comprising a urea formaldehyde condensation product, blood albumen, ammonia, ammonium chloride and butylated naphthalene sulfonic acid and then cementing them together by pressing at 90–100° C. at a pressure of about 10 atmospheres.

ADOLF MENGER.
EUGEN BOCK.